United States Patent [19]

Klein

[11] 4,293,378

[45] Oct. 6, 1981

[54] ENHANCED WET STRENGTH FILTER MATS TO SEPARATE PARTICULATES FROM FLUIDS AND/OR COALESCE ENTRAINED DROPLETS FROM GASES

[76] Inventor: Max Klein, 257 Riveredge Rd., Tinton Falls, N.J. 07724

[21] Appl. No.: 110,844

[22] Filed: Jan. 10, 1980

[51] Int. Cl.$^3$ ............................................. D21H 5/18

[52] U.S. Cl. ..................................... 162/145; 55/527; 55/528; 55/DIG. 13; 162/146; 162/164 R; 162/166; 162/168 R; 162/168 N; 162/169; 210/504; 210/505; 210/508; 210/509

[58] Field of Search ............... 162/145, 146, 156, 169, 162/168 R, 168 N, 164 R, 165, 166; 210/504, 505, 508, 509; 55/527, 528, DIG. 13, DIG. 16

[56] References Cited

U.S. PATENT DOCUMENTS

| | | | |
|---|---|---|---|
| 3,228,825 | 1/1966 | Waggoner | 162/156 |
| 3,274,103 | 9/1966 | Adams | 210/505 |
| 3,573,158 | 3/1971 | Pall et al. | 162/146 |
| 3,622,445 | 11/1971 | Heidweiller | 162/156 |
| 3,749,638 | 7/1973 | Renaud et al. | 162/156 |

Primary Examiner—Peter Chin
Attorney, Agent, or Firm—Dann, Dorfman, Herrell and Skillman

[57] ABSTRACT

A glass fiber filter mat possessing excellent wet strength which is in the form of a non-woven matrix of glass micro-fibers including polymer micro-bits derived, for example, from a non-brittle expanded, thermoplastic styrene polymer or a flexible foamed polyurethane, the micro-bits being substantially free of intact cells. Also included in the filter mat is a cobeat or intimate blend of cellulose fibers and the polymer micro-bits, which may additionally contain polyester fibers, as well as a combination of binders, viz., polyvinyl alcohol and a melamineformaldehyde resin.

12 Claims, No Drawings

ENHANCED WET STRENGTH FILTER MATS TO SEPARATE PARTICULATES FROM FLUIDS AND/OR COALESCE ENTRAINED DROPLETS FROM GASES

BRIEF DESCRIPTION OF INVENTION

This invention is that of glass fiber filter mats applicable to separate from fluids, and particularly from gases and vapors, specific other gases which may be undesirable and to coalesce entrained liquid droplets, and particulates from liquids, which filters have enhanced tensile strength when wetted by the resulting liquid contacting them. These filter mats (briefly called enhanced wet strength filter mats for fluids) in addition have good tensile strength (e.g. when dry as unrolled from a reel), high porosity providing maintained good flow-through rates and yet sufficient density enabling filtering out from liquids finely divided solid particles of even as low as 0.5 micron and less in size and such particles and/or entrained liquid droplets from aerosols or gaseous and/or vapor streams, as well as to coalesce entrained liquid droplets and remove them, and also to adsorb other gases from such streams. The preparation of these mats is included.

The enhanced wet strength glass fiber filter mats of this invention are prepared by use of paper-making equipment and procedure as a wet laid, porous, non-woven matrix composed of randomly arranged haphazardly intersecting and overlapping glass fibers (beneficially of two different dimensions) admixed as at about 80% of the mat content and with considerably smaller amounts of a cobeat (composed of cellulose and of polymer micro-bits, and with added polyester fibers) and of additional polymer micro-bits alone, and a minimum amount of about 3.3% of a cationic melamine-formaldehyde resin apparently chemically bound at least to the cellulose.

The polymer micro-bits, the polyester fibers, and the melamine-formaldehyde resin are more fully described further below. The cobeat contributes to the structural integrity of the mat. The polyester fibers contribute in part to the tensile strength in development of the web on the Fourdrinier screen. The polymer micro-bits (derived from an expanded, thermoplastic styrene-polymer or lower polyolefin or a flexible foam polyurethane) contribute to the enhanced porosity of the filter mat. The cationic melamine-formaldehyde resin enhances the wet strength of the finished filter mat.

BACKGROUND OF THE INVENTION

U.S. Pat. No. 2,559,220 issued July 3, 1951 shows that the wet strength of cellulose paper can be improved by adding to an aqueous suspension of cellulose paper-making fibers a suitable quantity of an aqueous colloidal solution of a cationic melamine-formaldehyde resin as a binder, the preparation and constitution of which resin is shown in the U.S. Pat. No. 2,345,543 of Mar. 28, 1944.

Attempts were made to produce a glass fiber paper by adding such aqueous colloidal solution of that cationic melamine-formaldehyde resin to an aqueous dispersion of paper-making glass fibers to try to provide a glass paper by wet lay procedure.

However, that was found to be ineffective because that aqueous binder solution was unable to wet the glass fibers to adhere to them, so that most to all of melamine-formaldehyde resin binder solution drained out from the glass fibers through and down out of the Fourdrinier screen. Attempts were made to overcome that difficulty by admixing cellulose fibers with the glass fibers and using the same melamine-formaldehyde resin, but the difficulty was not overcome. Apparently, the resin binder caused the cellulose fibers to agglomerate with the result that it was impossible to obtain a useful uniform web.

Urea-formaldehyde and phenol-formaldehyde resin systems are used as binders in the dry lay method of making glass paper, by spraying a solution of the pre-polymer (i.e. uncured) stage of the resin onto a dry layer of glass fibers as formed on the moving Fourdrinier screen. A phenol-formaldehyde prepolymer system has been sprayed onto a glass fiber layer formed from an aqueous slurry on a Fourdrinier screen.

In both of the foregoing cases the concentration of the prepolymer resin used exceeded 12% of the weight of the glass fiber layer, and the curing or cross-linking temperature zone was held at 248° C. in a hot air oven about 200 feet long or in a high temperature curing heating zone with the curing temperature provided by direct heat from an open flame into the inner surface of a steel roller contacted by passage of the glass layer over it in an oven held at about 260° C. In those cases the evolution of obnoxious and dangerous vapors of formaldehyde and phenol from the curing zone was very apparent.

Emulsions of polystyrene, polyacrylates, and of polyvinyl chloride, each separately, are used in making glass webs, but to be effective each has to be applied at a concentration exceeding 20%. Then after spraying the glass paper web, hot calendaring is required to attain significant wet strength. As a result the glass matrix is extensively blinded with consequent little or no utility as a filter.

The foregoing difficulties, shortcomings and disadvantages of these various foregoing efforts are overcome by the provision of the glass fiber filter mat of this invention.

DESCRIPTION OF THE INVENTION

This invention, by the components used in providing its glass fiber filter mats, avoids agglomeration of the small percentage of cellulose used. This invention also avoids the loss of the cationic colloidal melamine-formaldehyde resin down from the matrix during its formation on the Fourdrinier screen and in addition provides a final filter mat with a high level of porosity and yet enhanced tensile strength when wetted.

Considered broadly, the glass fiber filter mats of the invention are a wet laid, non-woven matrix of randomly arranged, haphazardly intersecting and overlapping fibers and comprising in percent, by weight of the mat, about 73.6% (from about 64.1 to about 83.5%) of glass fibers (for example, in equal parts of one inch length Owens-Corning's K fiber of 12 micron diameter and three-eighths inch DE fiber of 6 microns diameter).

about 9.16% (from about 5.5 to 12.8%) of polymer micro-bits (further below described), about 5.13% (from about 2.8 to about 8.1%) of polyvinyl alcohol (98% hydrolyzed) in powder form or as fibers, about 8.1% (from about 6.6 to about 9.5%) of a cobeat composed of one part of polymer micro-bits to from about one to two parts of cellulose and with up to about 7% of their joint weight being non-shrinkable, non-slip polymer fibers (e.g. of a polyethylene terephthalate polyester); and about 4.5% (from about 3.35% to about 5.5%) of a melamine-formaldehyde resin component provided by a colloidal cationic melamine-formaldehyde resin, as a binder.

While the use of equal parts of the DE and K glasses presently appears to be desirable, the ratio may be varied even to using in some formulations varying ratios to all of one or the other of them. Also, the use need not be limited to merely the DE and K fibers, as glass fibers from one source, for the current corresponding sizes of like fibers from any other source may be used.

The cobeat is so-called because, after dispersing each of the paper-making cellulose fibers and polymers micro-bits (in the ratio of one part of the latter to from about one to two parts of the cellulose) to uniform dispersion in a paper-making pulper, that dispersion then is fed into the beater and subjected to beating action until the freeness is 400 or more but not over 450. The beater dispersion then is transferred to the beater chest where there is admixed into that dispersion fibers of one or more of a non-shrinkable, non-slip fiber-forming polymer in an amount up to about 7% of the total of the cellulose and micro-bits. The resulting dispersion then can be put through the usual paper-making steps and dried over drum dryer cans and through an Overly drier (of the Overly Corporation, Ramsey, New Jersey, U.S.A.) to a storable product containing little if any water and thus available for use when needed.

The cellulose fibers are those of paper, and better yet writing paper, grade such as cotton fibers (from cotton rags or linters). These cellulose fibers for convenience are prepared in the form of the so-called wet lap cotton fibers as those commonly used in writing paper making to provide its cotton rag content. The wet lap is prepared for the most part from cotton fiber cuttings and cotton linters which are washed (bleached if necessary), separated (as in a hollander) into fibers of from about 4.23 mm. to about 1.27 cm. in length and fed to a wet lap-making machine and passed from it as a web between pressure rolls and leaving them as a web about 2.1 mm. thick (containing about 80% moisture). They then may be dried as shown shortly above through passage over drum dryer cans, and lapped up and back over and over on a pallet usually to a pile of about 363.8 kilos gross weight and containing in equilibrium about 6% moisture.

The micro-bits constituent of the gas-vapor treating mats of the invention are micro-bits of any of an expanded, thermoplastic styrene-polymer or lower polyolefin, non-brittle in expanded form, or of a flexible foamed polyurethane likewise non-brittle in expanded form. These micro-bits of an expanded, thermoplastic styrene-polymer or lower polyolefin are more fully described (in my copending U.S. patent application Ser. No. 833,644 filed Sept. 15, 1977, now U.S. Pat. No. 4,207,378 issued on June 10, 1980.) as an expanded, thermoplastic, non-brittle in expanded form polymer selected from a styrene-polymer and a lower polyolefin from polyethylene to poly-methylpentene.

These micro-bits are (a) from about 40 to about 325 microns long and from about 20 to about 320 microns wide, (b) from substantially completely to entirely completely free of intact cells of the expanded polymer bit-pieces from which they were produced, (c) substantially without any uniformity in outline of the individual micro-bits particles, and (d) in density from about 85 percent of, to about substantially the same as, the specific unexpanded polymer from which there was provided the aforesaid expanded polymer.

These micro-bits of an expanded, thermoplastic styrene-polymer or a lower polyolefin are produced from so-called bit-pieces of any of the expanded thermoplastic, non-brittle in expanded form styrene-polymers or lower polyolefins as starting material. The term "styrene-polymer" is explained in the aforementioned application Ser. No. 833,644. Their content and all other parts of that application referred to in this application are incorporated herein by reference as if actually recited herein.

The foamed polyurethane micro-bits are obtained from flexible polyurethane foam, the preparation and properties of wich foams are described, for example, in the "Handbook of Foamed Plastics", Bender, Rene J., Section X, pp. 173–236, Lake Publishing Corporation, Libertyville, Illinois, U.S.A. (1955), "Polyurethanes: Chemistry and Technology," Saunders & Frisch, Chapter VII, Part II, Interscience Publishers, New York, N.Y., U.S.A. (1964), and "The Development and Use of Polyurethane Foams", Doyle, E.N., pp. 233–256, McGraw Hill Book Company, New York, N.Y., U.S.A. (1971).

The flexible polyurethane foams useful to provide foamed polyurethane micro-bits preferably should be no greater than 72.14 gm. (i.e. grams) per liter in density, beneficially ranging from about 360 to about 120 gm. per liter, and show excellent recovery after 75% deflection with approximately less than 1% loss in height (as determined by American Society of Testing Materials D-1564-64T).

The flexible foam polyurethanes are not obtained in the foregoing same bit-pieces form as are the styrene-polymers and lower polyolefins, but rather in continuous foamed blocks as a result of the reaction that provides the polyurethane. Accordingly, the foamed polyurethane blocks first are shredded into bit-pieces (for example, similar to how they may be prepared for use in stuffing into various articles).

The foamed polyurethane micro-bits are more fully described (as in my copending U.S. patent application Ser. No. 833,643 filed Sept. 15, 1977 now U.S. Pat. No. 4,200,679 issued on Apr. 28, 1980.) as comprising broken and interconnected strand portions from adjacent cells of the flexible foam, which strand portions show substantially total absence of intact cells and cell windows and are tripodal particles with generaly uneven length legs, the strand portions having hook-like projections, indentations and flutes resulting from destruction of the cells and cell windows of the starting flexible foam, and being substantially without uniformity in outline as to their individual particles. The contents of that application referred to in the specification of this application are incorporated herein by reference as if actually recited herein in full.

The micro-bits of any expanded thermoplastic, non-brittle in expanded form styrene-polymer or lower polyolefin or flexible foamed polyurethane are prepared by disintegrating the respective starting expanded polymer bit-pieces (which as to polyurethanes are pieces of shredded flexible polyurethane foam) in a comminuting machine such as that described in the aforesaid patent application Ser. No. 833,644 and by the method described in that application and illustrated buy its examples.

The herein applicable non-shrinkable, non-slip fiber-forming polymers are exemplified by, but not limited to, the fiber-forming polyethylene terephthalate polyesters such as the TREVIRA polyethylene terephthalate polyester used and identified in Example 2 below, the FORTREL polyethylene terephthalate polyester and the KODEL dimethyl 1,4-cyclohexane dimethanol terephthalate polyester, as well as fiber-forming polyacrylate fibers and polyvinylnitrile fibers.

The melamine-formaldehyde resin component of the filter mat of the invention is provided by using in the production of the filter mat (as illustrated in Example 2 below) an aqueous colloidal suspension of a cationic malamine-formaldehyde with two moles of formaldehyde linked to the melamine moiety, in the form of methylol groups, and being in equilibrium with one mole of the formaldehyde which is dissolved in the acid aqueous medium; the resin being cationic by the condensation of its two reactants in an acid aqueous medium, all as specifically described, explained and illustrated in the earlier above mentioned U.S. Pat. Nos. 2,345,543 and 2,559,220.

Lower cost favors using the melamine-formaldehyde resin prepared by use of hydrochloric acid rather than any of the other applicable acids disclosed in those two patents. It is also better to use the colloidal solution of the resin in its diluted, longer time stable concentration.

The invention is illustrated by, but not restricted to, the following examples, the first of which concerns preparation of the polyester-containing cobeat:

EXAMPLE 1

Preparation of Polyester-containing Cobeat 318 kg. (dry basis) of cellulose (from 632 kg. wet lap cotton rag fibers of 50% moisture) and 159 kg. (dry basis) of polystyrene micro-bits were charged into 11,455 liters of water in the pulper and agitated by its defibering rotor for 10 minutes to uniform dispersion which then was transferred to the beater. There this dispersion was subjected to beating action for 4 hours when it attained a freeness of 425.

190 liters of that slurry of cellulose and micro-bits were uniformly admixed into 22,710 liters of water in the beater chest. Into that diluted slurry there was admixed 32 kg. of the (just below identified) TREVIRA polyethylene terephthalate polyester. The resulting uniform mixture then was pumped to the machine chest. From there it was pumped to the head box, diluted as customary to a consistency for the screen and discharged as usual (in paper-making) onto the Fourdrinier screen.

The resulting web than was fed to pass over 2 dryer cans heated to 116° C. and then through the Overly dryer (10 feet long) at 205° C. at a speed of 16.3 meters per minute as the dry polyester-containing cobeat to be held in stock available as needed.

The TREVIRA polyethylene terephthalate polyester is semi-dull, optically whitened, available as 1.27 cm. long fibers (of 1.5 denier) spun by conventional melt spinning process, having a special finish compatible with most anionic, cationic or nonionic binders (and providing rapid and excellent dispersion with a wide variety of furnish systems and furnish additives) and solution viscosity of 770±20 of ½ gram dissolved in 50 ml. of solvent (by weight, 40 parts tetrachloroethane and 60 parts phenol) at 25° C. (solution viscosity is the viscosity of the polymer solution divided by the viscosity of the solvent, with the result minus one multiplied by 1000); melting point 494° F., non-shrinkable in boiling water, and elongation at break 45% (available as TREVIRA 101 product of American Hoechst Corporation, Fibers Division, Spartenburg, S.C. 29301, U.S.A.). Additional information relating to TREVIRA 101 polyester fibers may be found in U.S. Pat. Nos. 4,137,181 and 4,179,543.

The enhanced wet strength filter mats (for fluids) of the invention are illustrated by, but not restricted to, the following example:

EXAMPLE 2

Filter Mat Produced by Paper-Making Steps on Paper-Making Equipment

Into a paper-making pulper (e.g. E. D. Jones, Pittsfield, MA, U.S.A., No. 3HI-LOW) containing 13,250 liters of water, equipped with its defibering and circulating rotor running at 800 r.p.m., there was charged 10 kilos (kg.) of the foregoing polyester-containing cobeat, 11.4 kg. (dry basis) of polystyrene micro-bits, 6.4 kg. of polyvinyl alcohol (98% hydrolyzed) powder, 3.8 liters of technical grade concentrated sulfuric acid (98.6%) and 9.1 kg. of sodium hexametaphosphate, to continue in a circular path for the period of 3 minutes for the defibering rotor to disperse the solids as separated fibers into homogeneous slurry in clump-free state.

With the rotor stationary there was admixed 45.4 kg. each of 1.27 cm. length type K fiber (of 12 microns diameter) and 49.53 mm. long DE fibers (of 6 microns diameter) and the mixing then resumed for 17 minutes. The resulting glass fiber-containing dispersion then was transferred to the beater chest.

Into 1890 liters of water in the pulper there was admixed while stirring 91 liters of the 6% solids containing aqueous collodial solution of the cationic melamine-formaldehyde resin (the specifications of which are given shortly below). The mixing was continued for half a minute and the resulting diluted melamine-formaldehyde resin dispersion was admixed into the beater chest content. The pulper then was flushed with 1890 liters of water and the resulting wash water also was admixed into the beater chest.

The beater chest content at a dispersed solids consistency of 0.6% as a homogeneous dispersion was transferred to the machine chest (used in paper-making to hold stock to be fed to the head box from which the furnish is to be fed onto the Fourdrinier).

From the machine chest the slurry on its way to the head box was passed through a stock pump which at 1170 r.p.m. propelled the slurry past an electonic in-line consistency sensor equipped to send a signal to a controller, which by initiating a current to a pneumatic transducer, controls the dilution water valve at the stock pump suction point to enable supplying the needed dilution water prior to passing another consistency sensor.

The slurry then continued through an in-line magnetic flow meter associated with a magnetic current converter providing a signal to a controller which, by a current to an activator transducer, serves to activate a flow valve to regulate flow of a slurry to the fan pump box. The fan pump, at 1750 r.p.m. and with facilities for temperature control, raised the temperture of the slurry to 48.5° C. and conveyed it at that temperature through a magnetic flow meter (similar to a gate flow meter) at 340.7 liters per minute to a Rice Barton open head box.

From there the slurry, passed under the head box slice bar, was distributed (at a consistency of 0.05% and pH of about 3.5) in uniform spread and flow over the traveling Fourdrinier screen, having 78 strands in the travel direction and 50 strands across, and 18.47 meters (m.) long by 2.72 m. wide.

In addition to drainage through the screen, water was removed from the slurry as the screen passed over 5 Rice Barton friction boxes operated at 7.62 cm. Hg. The slurry now as a web (at about 50% dryness) continued at the same speed onto an endless belt conveyor and after about 1.5 meters beyond the end of the screen passed about 10 cm. below a battery (about 60.5 cm. long) of infrared laps (52.4 kilowatts, at 3.8 amperes, 480 volts, single phase 60 cycle) providing at the mat surface a rheostat set temperature of possibly 649° C. The exposure of the wet mat to that temperature thus for about 2.4 seconds quickly caused solution of the PVA.

The partially dry web continued on through a tunnel dryer (about 3.67 meters long by 1.83 meters wide) providing a temperature of about 121° C. and then alternated in sequence over one and then under the next of each of a series of six dryer drums (the first drum providing a temperature of 113° C. with the temperature increased at each of them that followed with the last drum maintained at 127° C.), and on through the Overly dryer maintained at a drying atmosphere of 177° C. The finished filter mat web leaving the Overly dryer (at 99% dryness) then was collected on a web collecting reel.

This end product filter mat basis weight was 15.1 kg. per 100 square meters and its porosity from about 77.65 to 82.2 cubic meters per square meter per minute at 2.54 cm. of water pressure drop. The tensile strength of this mat in the direction of the web is 5.55 kg. per cm. and crosswise of the web is 2.95 kg. per cm. That is very considerably greater than the tensile strength of mats made without using the melamine-formaldehyde resin.

The wet strength of this mat of this example is 2.4 kg. per cm. which also is very much higher than the wet strength of filter mats made without using a melamine-formaldehyde resin and at least about a dozen times the wet strength of a glass fiber filter mat made by spraying a phenol formaldehyde resin binder onto dry laid glass fibers.

A sample of this web taken before it entered the Overly dryer, wetted for wet strength test, showed a wet strength of 0.72 kg. per cm. That compared with the wet strength after leaving that dryer (2.4 kg./cm.) shows the added advantage (3 times) of that final drying.

The enhanced wet strength filter mats of the invention can be folded and pleated without breaking.

The rag cotton fibers cellulose used in the examples may be used from any other practical cotton fibers source even from cotton linters. Cellulose from wood pulp, such as that used in preparing writing paper, also may be used. While the wet lap rag cotton fibers were used, the cellulose also may be taken as in the dry state when thus readily available or desired for any particular reason, although the use as wet lap provides a desirable economy.

The cellulose fibers provide initial wet strength to the matrix during the wet state stages in the filter mat production to retain the integrity and continuity of the web in passing over the suction boxes and on to the drying cans from the Fourdrinier screen.

For initial ready dispersion of the cellulose fibers and to enhance the integrity of the web, it is beneficial as an initial step physically to combine the cellulose fibers and micro-bits jointly as the cobeat, by ramdomly and intimately intermixing them in the beater thereby breaking open the cellulose fibers, apparently enhanced by action of the micro-bits on those fibers, and resulting in interlocking the micro-bits particles or parts of them in the thus extended fibrillar features of the cellulose. The micro-bits enhance the dispersion of the cellulose fibers during the intermixing and interlocking of those fibers and the micro-bits in the water, and serve to keep the cellulose fibers free of clumps and clusters. Similarly, use of the cobeat enables readily dispersing the other added fibrous constituents also free of clumps and clusters, while each of them is being intimately intermixed in the water into the developing matrix.

The polystyrene micro-bits in the cobeat of Example 1 as well as the additional separate micro-bits used in Example 2 can be replaced in each example by a respectively equivalent amount of any of the other herein described applicable polymer micro-bits to provide respective additional separate examples which are to be considered as if written out in full herein.

The separate micro-bits used in Example 2 also enhance the dispersion of the other fibrous substances added to provide the furnish for preparing the mats of the invention and particularly the glass fibers. As a result, while the sulfuric acid and the sodium hexametaphosphate are included (as in Example 2) for dispersing the glass fibers, the amounts of each of those two can be reduced and even eliminated with reliance on the micro-bits adequately to disperse the glass fibers.

While the separate amount of either one of the two different sizes of glass fibers can be increased to the corresponding reduction and even exclusion of the other one, increasing the content of the larger dimensin glass fibers increases the porosity (and so also decreased the capability of the filter mat to coalesce entrained droplets from air streams) and should not go to complete elimination of the smaller dimension glass fibers if the resulting porosity of the mat will be too large to enable retaining the size particles which it is desired to have the mat remove.

Increasing the ratio of the smaller dimension glass fibers tends to decrease the porosity to the extent that their reduction may need to be avoided. Instead one might increase the micro-bits content for they enhance porosity and can be used in an amount sufficient to provide the mat with the degree of porosity and flow-rate level required for the specific application wherein the mat is to be used.

The powdered polyvinyl alcohol used in Example 2 can be replaced by the less costly PVA fibers. However, the mat of Example 2, has greater wet strength than the corresponding mat, in the preparation of which PVA fibers are used. Thus, use of the PVA powder is preferred in spite of its difference in cost for actually on the average the cost of the PVA amounts to only about one-twentieth of the total cost of all of the materials used to provide the filter mat.

The TREVIRA polyethylene polyester fibers of Example 2 contribute to the initial wet strength in the web formed on the Fourdrinier screen. The polyester fibers can be replaced by a functionally equivalent amount of any of the other applicable non-shrinkable, non-slip, fiber-forming polymer fibers such as ay other fiber-forming terephthalate polyester as any other polyethylene terephthalate polyester or dimethyl-1,4-cyclohexane terephthalate dimethanol. Thus, each such additional example resulting from the just suggested replacement of the TREVIRA polyester of Example 2 is to be considered as if written out in full herein to avoid unduly extending this specification.

The separate range recited earlier above for each one of the substances used in the preparation of the mats of the invention is not to be considered as rigidly specifically limited to its respective specific minimum and maximum. That is so because each different replacemet of each specific one of the constituents may not necessarily behave exactly quantitatively in its functon as does the initial substance thus replaced. Accordingly, the maximum and minimum in each of the ranges for the different constituents in the preparation, and final constitution, of the mats is to be considered as involving adequate quantitative tolerance in relation to its respective function in the production and use of the mats.

For example, the amount of the fiber-forming polyester should be below that at which the polyester fibers are seen to begin to agglomerate during the mixing. Thus, the individual range of content of each of the different components is to be considered as being only rough, with the recognition that the functin which each of them serves in producing the mat and its planned application influences the respective possible respective minimum and maximum of each of them.

The aqueous colloidal solution of the cationic melamine-formaldehyde resin used in Example 2 (in preparing the furnish) contains this resin colloidally dispersed as 6% of solids in water as diluted by addition of water to the commercially readily obtained aqueous dispersin containing about 12.5% of the resin (as solids) resulting from the condensation in water of 3 mols of formaldehyde with one mol of melamine in the presence of 0.677 mol of hydrogen chloride, and having a pH of 1.4 and specific gravity of 1.052 at 25° C. and a hazy light blue color.

The hydrochloric acid (condensation agent) may be replaced by any other water-soluble acid that will not precipitate the colloidal resin (as does sulfuric acid) or adversely affect any of the substances to be used in preparing the furnish for the desired mat. Phosphoric acid, sulfurous acid, formic acid, and oxalic acid have been used successfully, and acetic acid may be used. However, hydrocloric acid is the least costly and most convenient.

The colloidal melamine-formaldehyde resin includes those with from 1 to 6 methylol substituents, but the most commonly used are the di- or trimethylol substituted and particularly the dimethylol, as used in Example 2, with the third mol of formaldehyde dissolved in the water.

The amount of cationic melamine-formaldehyde resin to use is influenced by the overall composition of the furnish and the level of wet strength to be provided.

The wet strength mats of the invention serve, for example, to eliminate undesired particles from waste water effluent streams. The Pittsfield, Massachusetts drinking water was clear to the eye, but after passage through a cartridge containing the filter mat of Example 2, a greasy-oily looking residue collected on the filter mat.

While the invention has been explained by detailed description of certain specific embodiments of it, it is understood that various substitutions or modifications can be made in any of them within the scope of the appended claims which are intended to cover also equivalents of these embodiments.

What is claimed is:

1. A glass fiber filter mat which is a wet laid, nonwoven matrix of randomly arranged, haphazardly intersecting and overlapping at least at the intersections primarily glass fibers, which mat comprises, in percents by weight,
   (a) from about 64.1% to about 83.5% of glass fibers composed of from about equal parts, to all of one, of (i) glass fibers of about one inch long and of about 12 microns in diameter and (ii) glass fibers of about three-eighths inch long and about 6 microns in diameter, and providing a network thereof in a matrix, and intermingles with said glass fibers network
   (b) from about 5.5% to about 12.8% of polymer micro-bits produced from a polymer selected from the group of (i) an expanded, thermoplastic styrene-polymer, (ii) an expanded lower polyolefin from polyethylene to polymethylpentene, said polyolefin being the polymer of any of the homologs from ethylene to methylpentene, (iii) a copolymer of propylene with from about 20 to about 30 percent by weight of ethylene, (iv) a melt alloy of polyethylene with up to about 10 percent by weight of polystyrene, (v) a melt alloy composed of at least 50 percent by weight of polypropylene and the balance being a copolymer of ethylene with up to about 30 percent (of the copolymer) being vinyl acetate, and (vi) a flexible foamed polyurethane, each said polymer being non-brittle in the form used to produce said micro-bits, said polymer micro-bits of (i) to (v) being from about 40 to about 325 microns long and from about 20 to about 325 microns wide, from substantially completely to entirely completely free of intact cells of the expanded polymer from which said micro-bits were produced, substantially without any uniformity in outline of the individual micro-bit particles, and having a density from about 85 percent of, to about substantially the same as, the specific unexpanded polymer from which there was provided the aforesaid expanded thermoplastic polymer from which said micro-bits were produced, said polymer micro-bits of (vi) being in the form of tripodal particles with generally uneven length legs, said particles being broken and inter-connected strand portions from adjacent cells of said flexible foamed polyurethane, said strand portions being substantially free of intact cell windows and having hook-like projections, indentations and flutes extending therefrom, said hook-like projections, indentations and flutes having been formed by the destruction of the cell windows of said flexible foam, and the amount of said micro-bits present in said filter mat being sufficient to provide the mat with the degree of porosity and flow-rate level required for the application wherein the mat is to be used; and comprises also
   (c) from about 2.8% to about 8.1% of polyvinyl alcohol participating as a binder in the matrix, and
   (d) from about 6.6 to about 9.5% of a cobeat composed of (i) one part of any of said polymer microbits intermixed with (ii) from about one to about two parts of cellulose fibers, and (iii) non-shrinkable, non-slip polymer fibers in an amount from zero to about 7% of the sum of said (i) and (ii); and (e) from about 3.35% to about 5.5% of a melamine-formaldehyde resin to function as a wet strength enhancing binder.

2. A filter mat as claimed in claim 1, wherein there are about equal parts of both sizes of the glass fibers.

3. A filter mat as claimed in claim 1, wherein the polymer micro-bits are those of a styrene-polymer.

4. A filter mat as claimed in claim 3, wherein the micro-bits are of polystyrene.

5. A filter mat as claimed in claim 1, wherein the non-shrinkable, non-slip polymer fibers of the cobeat are selected from the group of fibers of polyethylene terephthalate polyester and the dimethyl terephthalate of 1, 4-cyclohexane dimethanol.

6. A filter mat as claimed in claim 5, wherein the polyethlyene terephthalate polyester fibers are semi-dull, optically whitened 1.5 denier fibers spun by a conventional melt-spinning process, having a finish which is compatible with most anionic, cationic or nonionic binders and provides excellent dispersion with a wide variety of furnish systems and furnish additives, and is further characterized by a solution viscosity of 770±20 of ½ gram dissolved in 50 ml. of solvent (by weight, 40 parts tetrachloroethane and 60 parts phenol) at 25° C.; a melting point of 494° F., 0% shrinkage in boiling water and 45% elongation at break.

7. A filter mat as claimed in claim 2, wherein the polymer micro-bits are those of a styrene-polymer.

8. A filter mat as claimed in claim 7, wherein the styrene-polymer is polystyrene.

9. A filter mat as claimed in claim 8, wherein the non-shrinkable, non-slip polymer fibers of the cobeat are selected from the group of fibers of polyethylene terephthalate polyester and the dimethyl terephthalate of 1, 4-cyclohexane dimethanol.

10. A filter mat as claimed in claim 9, wherein the polyethylene terephthalate polyester fibers are semi-dull, optically whitened 1.5 denier fibers spun by a conventional melt-spinning process, having a finish which is compatible with most anionic, cationic or nonionic binders and provides excellent dispersion with a wide variety of furnish systems and furnish additives, and is further characterized by a solution viscosity of 770±20 of ½ gram dissolved in 50 ml. of solvent (by weight, 40 parts tetrachloroethane and 60 parts phenol) at 25° C.; a melting point of 494° F., 0% shrinkage in boiling water and 45% elongation at break.

11. A filter mat as claimed in claim 10, which contains by weight about 73.5% of glass fibers, about 9.1% of polystyrene micro-bits, about 5.1% of polyvinyl alcohol, about 8% of a cobeat composed of about one part of polystyrene micro-bits, about 2 parts of cellulose and about 7% by weight, based on the combined weight of the micro-bits and cellulose, of the polyethylene terephthalate polyester fibers, and about 4.5% of the melamine-formaldehyde resin.

12. A filter mat as claimed in claim 1, wherein the polyvinyl alcohol is in powder form.

* * * * *